United States Patent [19]

Dey

[11] 4,316,777

[45] Feb. 23, 1982

[54] RECHARGEABLE NONAQUEOUS SILVER ALLOY ANODE CELL

[75] Inventor: Arabinda N. Dey, Needham, Mass.

[73] Assignee: Duracell International Inc., Bethel, Conn.

[21] Appl. No.: 81,250

[22] Filed: Oct. 1, 1979

[51] Int. Cl.$^3$ .......................................... H01M 10/44
[52] U.S. Cl. ..................................... 204/2.1; 429/218
[58] Field of Search ............... 429/194, 196, 219, 191, 429/218, 219; 204/2.1, 14 N, 43 R

[56] References Cited

U.S. PATENT DOCUMENTS

| | | | |
|---|---|---|---|
| 3,043,896 | 7/1962 | Herbert et al. | 429/194 |
| 3,248,265 | 4/1966 | Herbert | 429/199 X |
| 3,506,490 | 4/1970 | Buzzelli | 429/191 X |
| 3,506,491 | 4/1970 | Buzzelli | 429/191 X |
| 3,506,492 | 4/1970 | Buzzelli et al. | 429/191 X |
| 3,953,302 | 4/1976 | Rao et al. | 204/14 N |
| 4,086,403 | 4/1978 | Whittingham et al. | 429/194 |
| 4,195,123 | 3/1980 | Jumel | 429/194 |

FOREIGN PATENT DOCUMENTS 2013020  8/1979  United Kingdom .

OTHER PUBLICATIONS

J. R. Driscoll et al. "Lithium Inorganic Electrolyte Batteries" (Fort Monmouth, N.J.: U.S. Army Electronics Command. Mar. 1976, Report No. ECOM-74-00-30-91. pp. ii, 10, 11, 17, 18, 23, 26, 40–41.

*Primary Examiner*—Anthony Skapars
*Attorney, Agent, or Firm*—Ronald S. Cornell; Israel Nissenbaum

[57] ABSTRACT

A secondary electrochemical cell comprising a solid anode, an electrolyte and a cathode. The anode is a solid solution of silver and a metal which is an alkaline or alkali earth metal. The metal is capable of forming a solid solution with the anode on the recharging of the anode. Alternatively, the cell is formed in the discharged state with a solid porous silver anode, a cathode, a nonaqueous liquid electrolyte containing the alkaline or alkaline earth metal salts therein. The alloyed anode improves the rechargeability of the cell.

4 Claims, No Drawings

RECHARGEABLE NONAQUEOUS SILVER ALLOY ANODE CELL

FIELD OF THE INVENTION

The present invention relates to electrochemical cells and more particularly to cells containing a solid rechargeable anode comprised of a solid solution of silver and an alkali or alkaline earth metal capable of forming a solid solution with the anode on the recharging of the anode.

BACKGROUND OF THE INVENTION

Among high energy density electrochemical cells, those containing alkali or alkaline earth metal anodes, such as lithium, have the highest energy density per pound. Such metals, however, are highly reactive with water, and must be used with organic or inorganic nonaqueous electrolyte solvents such as dioxolane, sulfur dioxide, and thionyl chloride, with the latter two also functioning as active cathode depolarizers.

The total ampere-hours delivered by a cell generally can be greatly increased by using the cell, if possible, in a secondary mode. In the secondary mode the cell is cycled through a series of discharge-recharge cycles. Since the cell is recharged after each discharge, instead of being discarded, such a cell yields many more ampere-hours than primary or nonrechargeable cells.

In order for an alkali or alkaline earth metal anode to be usefully employed in a secondary mode, the metal must replate in an acceptable form on the anode during each recharge cycle. Such metals will deposit onto an anode from an ion containing solution, such as a cell electrolyte, on the passing of a current through the solution. But in a cell, an anode metal such as lithium will ordinarily electrodeposit in the form of dendrites and form an inactive, mossy or poorly adherent powdery layer on the surface of the anode. The dendrites that are formed penetrate the cell separator and short circuit the cell. Stronger cell separators cannot alone solve this problem, since the dendrites eventually penetrate almost any cell separator.

The dendrites not only short circuit the cell, but they also separate from the anode and become inactive during recharging. It is believed that such separation occurs because of the preferential dissolution of the bases of the dendrites during recharging. The poorly adherent powdery or mossy layer is similarly less electrically active due to its poor electrical contact with the anode. Further, the mossy layer creates mass transport limitations, which also adversely affect the rechargeability of the anode.

Electrical disconnection of the dendrites and the mossy layer from the anode results in a reduction in the active mass of the anode after each discharge-recharge cycle. The discharge capacity of the cell then decreases with each discharge-recharge cycle and eventually the anode becomes totally inactive. Thus dendrite formation would remain a problem even with an ideal separator which could prevent internal cell shorting.

The rechargeability of anodes are expressed by the net efficiency of anode utilization, which can be expressed by the formula:

$$\% \text{ NET EFFICIENCY OF ANODE UTILIZATION} = \frac{\text{CUMULATIVE CAPACITY OF ANODE (AMPERE HOURS)} \times 100}{\text{(INITIAL CAPACITY OF ANODE AMPERE HOURS)} + \text{(CUMULATIVE CAPACITY OF ANODE AMPERE HOURS)}}$$

For example, in a cell containing a lithium anode and a carbon cathode current collector, the efficiency of the anode has been determined to be about 25 to 30 percent. This figure is low because of the problems recited above.

It is postulated that the formation of the dendrites and the mossy layer results from the formation of a film on the anode. Freshly deposited metal, being highly reactive, reacts with the electrolyte to form a thin insulative film on the anode. This film in turn causes an uneven current density distribution, which produces further irregular metal deposition, such as dendrites and nonadherent layers. Furthermore, the film causes preferential dissolution of the bases of the dendrites during cell discharge, thus causing the dendrites to detach themselves from the anode.

Various additives, such as the ions of metals reducible by lithium and capable of forming lithium rich intermetallics or alloys, which are disclosed in U.S. Pat. No. 3,953,302, were developed to reduce the growth of dendrites. The cycling efficiency with these additives, even though high, is still not ideal, and a cell containing these additives still has a limited number of possible discharge-recharge cycles. Furthermore, these additives may cause a reduction in cell potential of up to one and one-half volts.

Another method of reducing the dendrite problem was disclosed in U.S. Pat. No. 4,002,492. This patent discloses a cell containing a lithium-aluminum anode. The anode contains at least eight atomic percent aluminum and the cell uses selected solvents such as dioxolane to further reduce dendrite growth. The problem however, is that on recharge lithium-aluminum intermetallics are formed and such lithium-aluminum intermetallics are powdery and do not form a continuous sheet. Consequently the lithium-aluminum must be held in an inactive matrix in order to be successfully used as a rechargeable anode. The use of the inactive matrix reduces the primary energy density of the battery and increases manufacturing complexity and expense.

THE INVENTION

It has now been discovered that lithium alloyed with silver is especially useful as an efficient anode for a secondary electrochemical cell. Surprisingly on charge, the lithium not only does not form dendrites or an inactive mossy layer to a detrimental extent, the replated lithium maintains a structurally strong alloyed anode.

Since the anode is solid during the operation of the cell of the present invention, the cell utilizing the anode will normally be kept below about 150° C., which is the lowest temperature at which a lithium-silver alloy can melt. Previously, lithium-silver alloys have been utilized in electrochemical cells in the molten state with the silver being added to reduce the melting point of the lithium. Consequently previously used molten alloys have been maintained at a temperature above 150° C.

Other alkali and alkaline earth metals such as sodium and beryllium are also capable of forming solid solutions with silver during the recharging of the anode.

Such alloys are also within the scope of the invention and can be used in the solid state in the secondary cells of the present invention.

The alloyed anode can be manufactured by the electrodeposition of lithium onto either a solid or porous silver containing electrode at temperatures below about 150° C., the melting point of the alloy. On electrodeposition, the lithium ions in the electrolyte regain electrons and spontaneously alloy with the silver component of the anode. The maximum rate of alloying during electrodeposition, with presently known electrolytes, is about 1 milliampere per square centimeter of actual surface area. Accordingly, porous substrates with high surface areas are preferred, especially since at rates of deposition exceeding available surface area, lithium forms dendrites and nonadherent powdery layers. At such rates the lithium plates faster than it can alloy with the silver, with the unalloyed lithium appearing as dendrites.

Upon recharge, the newly formed lithium-silver alloy, which is a solid solution, retains its physical integrity without degrading into powder, such as occurs with some lithium intermetallics such as lithium-aluminum. Since the lithium-silver alloy remains as a continuous sheet, a matrix is generally unnecessary, with resultant increased primary energy density and reduced cost. Additionally, since the lithium-silver solid solution retains its structural integrity during use, the cell containing such alloy can be assembled in a discharged state by initially using a silver anode and a lithium salt as the electrolyte. When the cell is initially charged, lithium ions deposit onto the silver anode and alloy with the silver to form a charged cell. The silver anode is preferably porous, to increase the surface area of the anode and the rate of alloying. On cell discharge the porous silver anode reappears since the silver does not dissolve into the electrolyte as the lithium does.

It is desirable to manufacture a discharged cell, since this eliminates the storage and handling of lithium or other highly reactive alkali or alkaline earth metals. The quantity of lithium or alkali or alkaline earth metals in solution in the electrolyte of the discharged cell should be sufficient to form the desired anode, on the full charging of the cell. Such an anode should have at least about 10 percent metal. The preferred quantity of lithium present in the anode on full charge is from about 50 to 80 percent by weight.

If an initially charged cell is desired, the lithium-silver or other solid solution of alkali or alkaline earth metal and silver is preferably formed by melting the metal and silver together and then thoroughly mixing the molten liquids. On cooling, a uniform solid solution is produced. This procedure should be done in a dry, inert atmosphere to prevent the reactive lithium from adversely reacting with the environment.

The amount of lithium present in the alloy can vary from about 10 to almost 100 percent by weight with the benefits of the present invention diminishing as one approaches either end of the range. The preferred amount of lithium being from 50 to 80 percent by weight. It has unexpectedly been found that the greatest percentage of anode utilization, without dendrite formation, occurs with about 50 to 80 percent lithium by weight lithium in the anode. This occurs despite the expectation that increased amounts of silver will increase cycling efficiency.

The lithium-silver alloy of the invention may be used in a cell as a substantially continuous sheet or with an optional conductive substrate to increase porosity. The alloy may be used as an anode in either a primary or secondary cell and can be used with the same electrolytes and cathodes as the previously used pure lithium.

Acceptable cells have an electrolyte solute, preferably having a lithium cation, dissolved in a nonaqueous, liquid, combination depolarizer and electrolyte solvent, and an inert conductive cathode current collector. Such a liquid depolarizer and electrolyte solvent can include inorganic or organic liquid oxyhalides, liquid nonmetallic oxides, liquid nonmetallic halides, and mixtures thereof. Preferred examples of such liquid depolarizers include, but are not limited to, phosphorous oxychloride ($POCl_3$), selenium oxychloride ($SeOCl_2$), sulfur dioxide ($SO_2$), sulfur trioxide ($SO_3$), vanadium oxytrichloride ($VOCl_3$), chromyl chloride ($CrO_2Cl_2$), sulfuric oxychloride ($SO_2Cl_2$), nitryl chloride ($NO_2Cl$), nitrosyl chloride ($NOCl$), nitrogen dioxide ($NO_2$), sulfur monochloride ($S_2Cl_2$), sulfur monobromide ($S_2Br_2$), vanadium oxytrichloride ($VOCl_3$), chromyl chloride ($CrO_2Cl_2$) and thionyl chloride ($SOCl_2$). Each of the above compounds can be used in any combination with each other, used separately, or used with thionyl chloride ($SOCl_2$) as the depolarizer. Each of the above, either alone or as cosolvents will dissolve a suitable electrolyte solute.

The liquid depolarizer and electrolyte solvent useful with the present invention is not limited to those cited above and can include other depolarizers known or proven useful with cells containing a lithium or alkali or alkaline earth metal anode. Examples of such other depolarizers are disclosed in U.S. Pat. Nos. 3,926,669, 3,578,500 and 4,156,058 incorporated herein by reference.

Nonaqueous inorganic or organic solvents, which do not detrimentally react with the anode, cathode and depolarizer can also be used in the present invention in addition to the liquid depolarizer and electrolyte solvent. Such organic solvents can include, but are not limited to, the many known solvents, such as esters, of which propylene carbonate is preferred and other esters including alkyl formates, alkyl acetates, butyrates, also orthoesters such as methyl or ethyl orthoacetate or orthoformate are also useful. Ethers, of which tetrahydrofuran is preferred but other ethers such as methoxymethanes and ethanes, ethers derived from ethylene glycol and polyethylene glycol, cyclic ethers such as dioxane, dioxolane and the like are also useful. Aldehydes and ketones such as acetaldehyde, acetone and the like. Nitriles such as acetonitrile, propionitrile, benzonitrile and the like. Amides and substituted amides such as formamide, N,N dimethylacetamide and the like and closely related amidelike compounds such as N,N dimethyl methyl carbamate and tetramethylurea. Also useful are organic solvents, including those described above, in which is dissolved sulfur dioxide.

Electrolyte solutes useful with the present invention include Lewis bases having the general formula $A_mB_n$ where A is an element selected from the group consisting of lithium, sodium, potassium, rubidium, cesium, magnesium, calcium, strontium, barium and the rare earths and B is an element selected from fluorine, chlorine, bromine, iodine and oxygen. Included in this latter category are cesium chloride, rubidium chloride, and barium chloride. Further, the more preferable solutes have large anions which are stable to oxidation and reduction.

Other preferred solutes include Lewis acids, particularly aluminum chloride, boron trichloride, boron fluoride, tin chloride, antimony chloride, antimony fluoride, titanium chloride, aluminum bromide, phosphorus fluoride, phosphorus chloride, arsenic fluoride, arsenic chloride, zinc chloride and zirconium chloride, in conjunction with a metal halide such as lithium chloride. Solutes containing lithium are most preferred and include among others lithium tetrachloroaluminate, lithium tetrachloroborate, lithium tetrafluoroborate, lithium hexafluorophosphate, lithium hexafluoroarsenate, lithium hexafluoroantimonate, lithium hexachloroantimonate, lithium hexachlorostannate, lithium hexachlorozirconate, lithium hexachlorotitanate, lithium chlorosulfate, lithium perchlorate, lithium aluminum chloride, lithium tetrafluoroboride, lithium hexafluorophosphide and lithium hexafluoroarsenide.

Cathodes useful with the liquid depolarizers are conductive metal current collectors inert to the anode electrolyte solutes, depolarizer and solvents if any. Applicable cathode collector materials include the alkaline earth metals, such as berylium, magnesium, calcium, strontium and barium; the Group IIIA metals, such as aluminum, gallium, indium, and thallium; the Group IV A metals, such as tin and lead; the Group V A metals, such as antimony and bismuth; the transistion metals, such as scandium, titanium, vanadium, chromium, manganese, iron, cobalt, nickel, copper, zinc, yttrium, zirconium, niobium, molybdenum, ruthenium, rhodium, palladium, silver, cadmium, hafnium, tantalum, tungsten, rhenium, osmium, iridium, platinum, gold and mercury; and rare earth metals such as lanthanum, cerium, praseodymium, neodymium, samarium, europium, gadolinium, terbium, dysprosium, holmium, erbium, thulium, ytterbium, and lutetium, and combinations thereof. The most preferred nonconsumable cathode is a carbonaceous material pressed onto a grid of a metal herein disclosed.

In another embodiment, the anode of the present invention is used in a cell in combination with an electrolyte solute dissolved in a nonaqueous solvent and an active cathode. The solute preferably has a lithium cation and the solvent is preferably organic. Suitable solutes and solvents are the same as disclosed above for cells employing liquid depolarizers and inert cathode current collectors.

The preferred active cathodes include those presently used with lithium anodes and include, but are not limited to, active metal oxides, transition metal chalocogenides and metal halides, metal chromates, metal sulfide dichalocogenides, metal permanganates and chromium trioxide and graphic intercalation compounds. Preferred active cathodes include vanadium pentoxide ($V_2O_5$), molybdenum trioxide ($MoO_3$), silver chromate ($Ag_2CrO_4$), mercurous chromate ($HgCrO_4$) and titanium disulfide ($TiS_2$).

The open circuit voltage of a cell using the lithium-silver anode is substantially the same as a similar cell with a pure lithium anode. On discharge, the alloy anode has a discharge voltage about one-quarter of a volt less than a similar cell with a pure lithium anode.

The total energy capacity of the anode is reduced by the presence of the silver which displaces some of the lithium. The silver is relatively inactive and will not discharge against the cathodes commonly used with lithium anodes. The reduction in capacity is small in the preferred embodiments of the present invention, due to the fact that the number of moles of silver present in the anode is small compared to that of the lithium present and the capacity of the anode is dependent on the ratio of moles of lithium to that of any inert material, not the ratio of weight percents.

The silver due to its high atomic weight compared to that of the lithium does increase the weight of the anode, but since the anode comprises only a small percentage of the total weight of a cell, the increase in cell weight is insignificant. The energy density of the cell then is not significantly decreased by the addition of silver to the anode.

Though the quantity of dendrites produced on the surface of the anode on recharging is small, such dendrite formation may be further reduced by only partially discharging the anode during each discharge-recharge cycle. The small depth of discharge depletes only the surface lithium. Thus on recharge, the lithium ions need only redeposit and alloy upon the surface of the anode, instead of having to penetrate deep within the anode. Since lithium easily deposits and alloys upon the outer surface of the anode, the amount of unalloyed, i.e. dendritic lithium present on the anode surface is thereby reduced.

The net efficiency of anode utilization can also be increased by incorporating multiple layers of a separator, or several different layers of separators in the cell. Suitable separators include those generally used in electrochemical cells containing a lithium anode. Examples of separator materials include ceramic, glass, cellulose and various plastics having small pore sizes. Specific examples of such materials include porous glass, fritted glass, cellulosic materials, nonwoven porous polytetrafluoroethylene and other fluorinated polymers, polypropylene, polyethylene and other polyolefins.

The following table and example are given to illustrate the construction and efficacy of the present invention. In the examples as well as throughout the specification and claims all parts and percentages are by weight unless otherwise indicated.

Table 1 shows the change in net efficiency of lithium utilization of the anode, as various modifications were made to a cell. The cell was comprised of a lithium anode, an electrolyte comprised of a mixture of lithium salts, sulfur dioxide, acetonitrile and propylene carbonate, and a cathode current collector comprising carbon pressed onto an expanded metal grid.

Cell 1 of table 1 is a primary cell with a lithium anode. This cell has an efficiency of from about 25–30 percent.

Cell 2 was similar to cell 1 but contained a multi-layer separator instead of the single layer found in cell 1. Further, cell 2 contained a three molar solution of lithium perchlorate instead of the one molar solution in cell 1. This new separator reduced the shorting problems associated with dendrite formation in cell 1. Further, the threefold increase in the lithium ion concentration reduced the mass transport problems associated with the mossy layer which formed on the anode. The combination of these two improvement increased the efficiency of the cell to 65–70 percent.

In cell 3 the lithium was pressed onto porous substrates of nickel and stainless steel, while the conditions present in cell 2 were maintained. There was no improvement in the efficiency of cell 3. From this result it can be seen that causing the pure lithium anode to be more porous did not by itself increase the ability of the lithium to be a better secondary anode.

Cell 4 was made by adding a quantity of calcium ions to the electrolyte of cell 2. Such an additive was disclosed in U.S. Pat. No. 3,953,302. The ions coplated with the lithium onto the lithium anode during recharge. The resulting cell had an efficiency of 70-75 percent. Coplating of calcium ions did increase the rechargeability of the lithium anode.

Cell 5 is similar to cell 2 in construction but contains the alloy anode of the present invention which is comprised of 65 percent by weight of lithium and 35 percent by weight of silver. The efficiency of cell 5 was found to be 80-82.5 percent based on a depth of utilization of the anode, per cycle, of 5-10 percent of the initial capacity of the anode. Even though the efficiency of cell 5 was only about 8 percent higher than cell 4, the number of discharge-recharge cycles a cell will operate through increases exponentially with the increase in the efficiency of the lithium utilization of the anode. Thus, an increase of only 8 percent resulted in almost a doubling of the number of discharge-recharge cycles the cell successfully completed.

The construction of cell 5 of table 1 is shown in the following example.

EXAMPLE 1

The anode for the cell is manufactured by melting 65 weight percent lithium and 35 weight percent silver in a dry box, in an inert atmosphere. The alloy is equilibrated at a temperature of 50 degrees Celsius above the melting point of the alloy for 12 hours. The alloy is then cast into a plate and cooled. The cooled plate is then pressed to form a 0.8 millimeter thick foil, which foil is then loaded onto a precut nickel grid. The completed anode has dimensions of 19 by 4.1 centimeters with a thickness of 0.8 millimeters and a weight of 5 grams.

The electrolyte for the cell is made by mixing seven volumes of acetonitrile with three volumes of propylene carbonate. Sulfur dioxide is then bubbled through the mixture until saturation, about 50 grams of sulfur dioxide were found to dissolve per 100 milliliters of the mixture. Sufficient lithium perchlorate (LiClO$_4$) is then added to make a three molar solution.

The cathode current collector is manufactured by pressing carbon onto an aluminum grid. The finished current collector has dimensions of 16.5 by 3.8 centimeters, with a thickness of 0.4 millimeters and a weight of 1.2 grams.

The cell is constructed by placing the anode over the cathode current collector with the two separated by a 0.12 millimeter thick sheet of porous polypropylene. The anode and cathode are placed in a vessel and sufficient electrolyte is added to cover them. Since the capacity of the cathode current collector is smaller than that of the anode the cell is cathode limited.

The cell as constructed above has an open circuit voltage of 2.5 volts and a nominal capacity of 1 ampere-hour when operated at room temperature and atmospheric pressure. The anode as constructed has a capacity of 11.8 ampere-hours. The cell is discharged to 2.0 volts and recharged to 3.8 volts. This gives an 8.5 percent depth of discharge. The cell is recharged at a current density of 0.635 milliamperes per square centimeter of anode. The cell goes through 55 cycles before the cell can not produce a discharge voltage of 2.0 volts, at which point it is considered to be inoperative. The cell achieves an 82.5 percent net efficiency of anode utilization.

TABLE 1

Lithium anode efficiency achieved in rechargeable Li/SO$_2$ cells operating in limited electrolyte configuration.

| Cell | Approach | Net Efficiency of Lithium Utilization (%)* |
|---|---|---|
| 1 | Start - 1M LiClO$_4$, AN . PC . SO$_2$ 1 layer separator | 25-30 |
| 2 | Use od multi-layer separator and 3M LiClO$_4$, AN . PC . SO$_2$ | 65-70 |
| 3 | Conditions in (2) + inert porous substrates of nickel and stainless steel | 65-70 |
| 4 | Conditions in (2) with coplating calcium with lithium | 70-75 |
| 5 | Conditions in (2) with Li—Ag bi-metallic anode (Li:Ag::65:35 w/o) | 80-82.5 |

*(cumulative capacity (AH/initial capacity of anode (AH) + cumulative capacity (AH) × 100

The depth of utilization of the anode per cycle based on the initial capacity of the anode was 5%-10% in the experimental cells leading to results in Table 1.

EXAMPLES 2 AND 3

A cell is made in accordance with that in Example 1 but using sodium or beryllium in the formation of the solid solution. The cell is tested similarly and is found to have substantially similar efficacy.

The preceeding table and examples are for illustrative purposes only. It is understood that changes and variations can be made without departing from the spirit and scope of the present invention as defined in the following claims.

What is claimed is:

1. A method for improving the rechargeability of a secondary electrochemical cell comprising the steps of forming a solid solution of an alkali or alkaline earth metal with at least ten percent by weight of silver; and forming a solid anode for the cell from the solid solution, said metal being capable of forming a solid solution with said anode on the recharging of said anode.

2. The method of claim 1 wherein said metal is selected from the group consisting of lithium, sodium and beryllium.

3. The method of claim 2 wherein said metal comprises lithium.

4. The method of claim 1 wherein the silver comprises from about 20 to about 50 percent by weight of the solid solution.

* * * * *